US012532147B2

(12) United States Patent
Lee et al.

(10) Patent No.: US 12,532,147 B2
(45) Date of Patent: Jan. 20, 2026

(54) METHOD FOR GROUP CALL FLOOR CONTROL AND ELECTRONIC DEVICE THEREFOR

(71) Applicant: Samsung Electronics Co., Ltd., Suwon-si (KR)

(72) Inventors: Jungdo Lee, Suwon-si (KR); Jaesung Park, Suwon-si (KR); Wonshik Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 609 days.

(21) Appl. No.: 18/077,489

(22) Filed: Dec. 8, 2022

(65) Prior Publication Data

US 2023/0103410 A1 Apr. 6, 2023

Related U.S. Application Data

(63) Continuation of application No. PCT/KR2021/006953, filed on Jun. 3, 2021.

(30) Foreign Application Priority Data

Jun. 12, 2020 (KR) .......... 10-2020-0071532

(51) Int. Cl.
*H04W 4/08* (2009.01)
*H04L 65/65* (2022.01)
*H04W 4/10* (2009.01)

(52) U.S. Cl.
CPC .............. *H04W 4/08* (2013.01); *H04L 65/65* (2022.05); *H04W 4/10* (2013.01)

(58) Field of Classification Search
CPC .......... H04W 4/10; H04W 4/08; H04W 76/45
See application file for complete search history.

(56) References Cited

U.S. PATENT DOCUMENTS

| 7,483,400 B2 | 1/2009 | Kuusinen et al. |
| 8,169,937 B2 | 5/2012 | Kuusinen et al. |
| (Continued) | | |

FOREIGN PATENT DOCUMENTS

| EP | 3 281 378 A1 | 2/2018 |
| KR | 10-2008-0035434 A | 4/2008 |
| (Continued) | | |

OTHER PUBLICATIONS

Motorola Solutions, Naming convention for timers; offnetwork floor participant, C1-162447, 3GPP TSG-CT WG1 Meeting #97, Ljubjlana (Slovenia), May 16, 2016.

(Continued)

*Primary Examiner* — Margaret G Webb
(74) *Attorney, Agent, or Firm* — Jefferson IP Law, LLP

(57) ABSTRACT

An electronic device is provided. The electronic device includes a communication circuit, at least one processor, and a memory. The memory may store instructions which, when executed, cause the at least one processor to participate in a push-to-talk (PTT) session of an off-network mode, receive a media packet including media data from an external electronic device of the PTT session while possessing a floor of the PTT session, determine whether the floor of the PTT session is maintained, on the basis of at least one parameter included in the header of the media packet, and transmit, when the floor of the PTT session is not maintained, a message indicating release of the floor of the PTT session.

15 Claims, 9 Drawing Sheets

(56) References Cited

U.S. PATENT DOCUMENTS

| | | |
|---|---|---|
| 8,503,483 B2 | 8/2013 | Foley |
| 10,028,110 B2 | 7/2018 | Barrett et al. |
| 10,225,294 B2 | 3/2019 | Ko et al. |
| 10,271,370 B2 | 4/2019 | Atarius et al. |
| 10,313,844 B2 | 6/2019 | Gupta et al. |
| 10,327,113 B2 | 6/2019 | Barrett et al. |
| 10,532,739 B2 | 1/2020 | Atarius et al. |
| 10,542,392 B2 | 1/2020 | Gupta et al. |
| 10,681,505 B2 | 6/2020 | Baek et al. |
| 10,735,915 B2 | 8/2020 | Hyun et al. |
| 10,951,670 B2 | 3/2021 | Li et al. |
| 11,070,956 B2 | 7/2021 | Gupta et al. |
| 11,186,274 B2 | 11/2021 | Atarius et al. |
| 11,343,656 B2 | 5/2022 | Hyun et al. |
| 2004/0076277 A1 | 4/2004 | Kuusinen et al. |
| 2007/0002836 A1* | 1/2007 | Lindner ............ H04W 4/10 370/352 |
| 2008/0098063 A1 | 4/2008 | Huh et al. |
| 2008/0273504 A1 | 11/2008 | Foley |
| 2009/0109879 A1 | 4/2009 | Kuusinen et al. |
| 2010/0240408 A1 | 9/2010 | Huh et al. |
| 2015/0223110 A1 | 8/2015 | Lindner et al. |
| 2016/0094607 A1* | 3/2016 | Bekiares ............ H04L 65/70 370/260 |
| 2018/0131734 A1* | 5/2018 | Ko ............ H04L 65/65 |
| 2018/0132072 A1* | 5/2018 | Hyun ............ H04W 4/10 |
| 2018/0242120 A1 | 8/2018 | Baek et al. |
| 2019/0014447 A1 | 1/2019 | Barrett et al. |
| 2020/0073522 A1 | 3/2020 | Gupta et al. |
| 2020/0139961 A1 | 5/2020 | Atarius et al. |
| 2020/0344578 A1 | 10/2020 | Baek et al. |
| 2021/0212157 A1* | 7/2021 | Wänstedt ............ H04W 76/36 |

FOREIGN PATENT DOCUMENTS

| | | |
|---|---|---|
| KR | 10-1672746 B1 | 11/2016 |
| KR | 10-2018-0050196 A | 5/2018 |
| KR | 10-2018-0050198 A | 5/2018 |
| KR | 10-2019-0038723 A | 4/2019 |
| WO | 2017/026866 A1 | 2/2017 |

OTHER PUBLICATIONS

Korean Office Action dated Oct. 4, 2024, issued in Korean Patent Application No. 10-2020-0071532.

* cited by examiner

METHOD FOR GROUP CALL FLOOR CONTROL AND ELECTRONIC DEVICE THEREFOR

CROSS-REFERENCE TO RELATED APPLICATION(S)

This application is a continuation application, claiming priority under § 365(c), of an International application No. PCT/KR2021/006953, filed on Jun. 3, 2021, which is based on and claims the benefit of a Korean patent application number 10-2020-0071532, filed on Jun. 12, 2020, in the Korean Intellectual Property Office, the disclosure of which is incorporated by reference herein in its entirety.

BACKGROUND

1. Field

The disclosure relates to a method for controlling a floor in a group call and an electronic device configured to perform the method.

2. Description of Related Art

Various types of device-to-device (D2D) communication are being studied. For example, in the case of a cellular network, the $3^{rd}$ generation partnership project (3GPP) standard organization supports device-to-device communication under the name of a sidelink. Such device-to-device communication is expected to have a higher need in certain situations, such as large-scale group communication in public safety or disaster situations. Mission critical push-to-talk (MCPTT) is being studied as device-to-device communication for this purpose.

In the case of push-to-talk (PTT) communication such as MCPTT, one electronic device in a group call may have a floor. The electronic device having the floor may be configured to transmit media data to other electronic devices in the group call, and the other electronic devices may be configured to output the received media data. That is, at a given time, only one electronic device among the electronic devices in the group call has the floor, and the other electronic devices may listen from the electronic device having the floor. As such, electronic devices related to the group call may obtain and release the floor according to a designated floor control method.

The above information is presented as background information only to assist with an understanding of the disclosure. No determination has been made, and no assertion is made, as to whether any of the above might be applicable as prior art with regard to the disclosure.

SUMMARY

The $3^{rd}$ generation partnership project (3GPP) technical specification 24.380 defines two types of floor control methods. For a floor control in an on-network situation, a floor control server performs the floor control. By the floor control server in the MCPTT server performing the floor control, the floor control server may allow one of the electronic devices involved in the group call to have the floor. For example, in an off-network situation, a separate specific floor control server does not exist. Instead, in an off-network situation, an electronic device having the floor may designate an electronic device that will have the floor subsequently. However, due to the characteristics of D2D communication, loss or delay of message packets may occur. In a situation in which message packet loss or delay occurs, floor control may not be performed as specified. In particular, in the case of an off-network situation, there is no separate floor control server, and as a consequence, the situation mentioned above may occur more frequently.

For example, in one group call session, a plurality of electronic devices may have the floor. In this case, the plurality of electronic devices having the floor may transmit media packets. In another example, an electronic device without the floor may decode and output only the media packet of one electronic device determined as having the floor, and ignore the media packet of the other electronic device. In this case, media packets may be substantially lost. Additionally, since a plurality of electronic devices transmit media packets using radio resources allocated to the group call, a media packet of one electronic device may act as interference with a media packet of another electronic device. Accordingly, if a plurality of electronic devices transmits media packets, call quality of the group call may deteriorate.

Aspects of the disclosure are to address at least the above-mentioned problems and/or disadvantages and to provide at least the advantages described below. Accordingly, an aspect of the disclosure is to provide an electronic device and method for preventing a plurality of electronic devices from maintaining the floor in an off-network group call.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, at least one processor operatively connected to the communication circuit, and a memory operatively connected to the at least one processor, in which the memory stores instructions that, when executed, cause the at least one processor to participate in a push-to-talk (PTT) session of an off-network mode, receive a media packet including media data from an external electronic device of the PTT session while a floor of the PTT session is possessed, determine whether to maintain the floor of the PTT session based on at least one parameter included in a header of the media packet, and transmit a message indicating release of the floor of the PTT session in a case of not maintaining the floor of the PTT session.

In accordance with another aspect of the disclosure, a method for floor control of an electronic device is provided. The method includes making a push-to-talk (PTT) group call of an off-network mode, receiving a media packet from an external electronic device involved in the group call, identifying whether the electronic device has a floor of the group call, in response to receiving the media packet, determining whether to maintain the floor based on at least one parameter included in a header of the media packet if the electronic device has the floor of the group call, and transmitting a message indicating release of the floor when the determination is made not to maintain the floor.

According to various embodiments disclosed herein, the electronic device may allow only one electronic device to have the floor in a group call at a given time.

The electronic device according to an embodiment disclosed herein may reduce packet loss in a group call.

The electronic device according to an embodiment disclosed herein may improve call quality in a group call.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
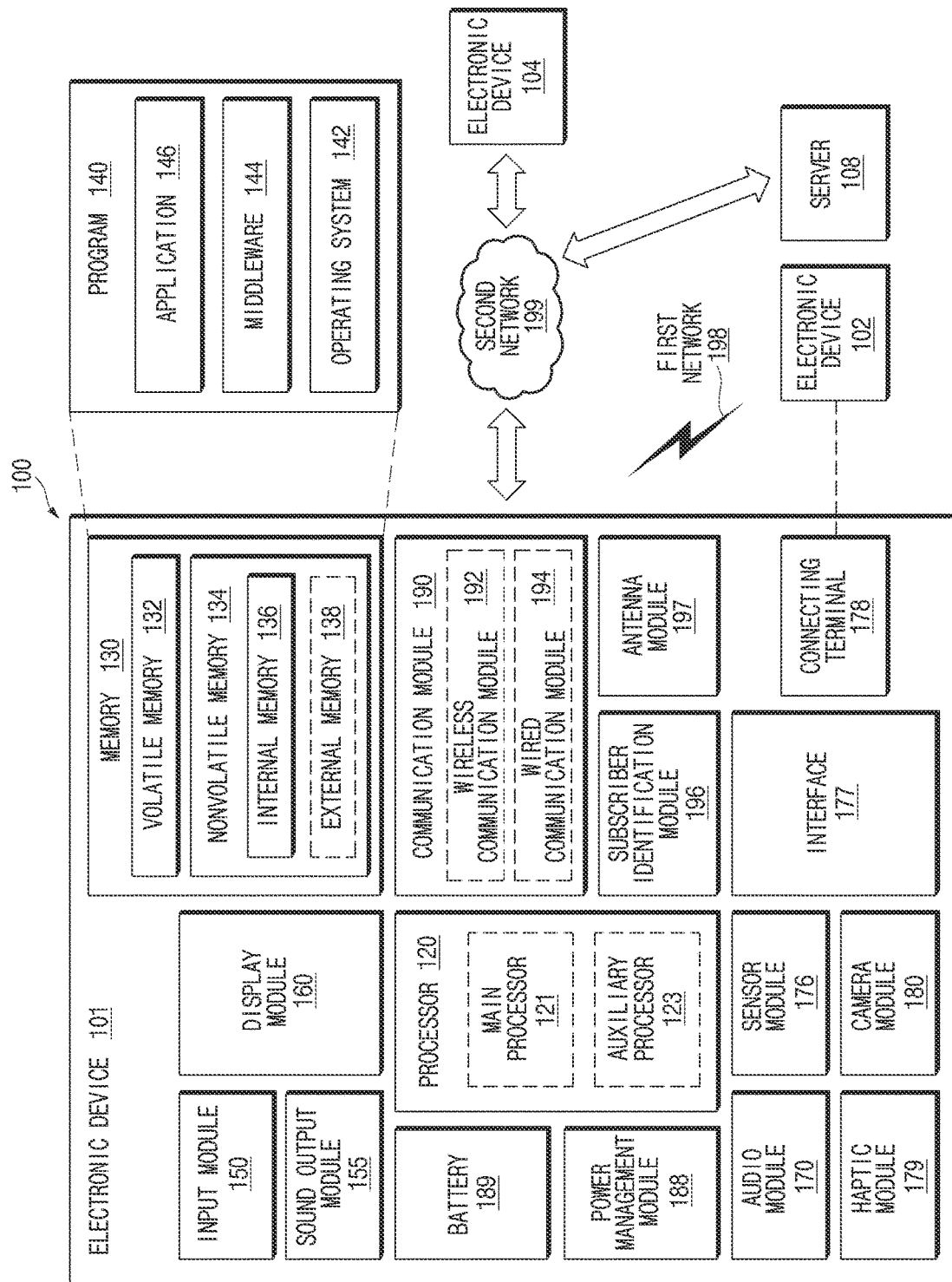
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In other embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. In another embodiment, the auxiliary processor 123 (e.g., the neural processing unit) may include a hardware structure specified for artificial intelligence model processing. An artificial intelligence model, for example, may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model, for example, may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia, playing a record, playing a sound, and the like. The receiver may be used for receiving incoming calls. In an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may be configured to detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. In an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one embodiment, the haptic module 179 may include, for example, a motor, a piezoelectric element, or an electric stimulator.

The camera module 180 may capture a still image or moving images. In an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. In an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. In an embodiment, the communication module 190 may include one or more communication processors that are operable independently from the processor 120 (e.g., the application processor (AP)) and supports a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192, for example, may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. In an embodiment, the wireless communication module 192 may support various requirements specified in the electronic device 101, an external electronic device (e.g., the electronic device 104), or a network system (e.g., the second network 199). According to another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. In an embodiment, the antenna module 197 may include an antenna including a radiating element composed of a conductive material or a conductive pattern formed in or on a substrate (e.g., a printed circuit board (PCB)). In another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. In an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. In an embodiment, the electronic device 101 may provide the outcome, with or without further processing of the outcome, as at least part of a reply to the request. To that end, a cloud computing, distributed computing, mobile edge computing (MEC), or client-server computing technology may be used, for example. In another embodiment, the electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. In an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. For example, with regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). Additionally, it is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more machine readable instructions stored in the storage medium, and execute it, with or without using one or more other components under the control of the processor. This allows the machine to be operated to perform at least one function according to the at least one instruction invoked. The one or more machine readable instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product, for example, may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to still other embodiments, operations performed by the module, the program, or another component may be carried out sequentially, in parallel, repeatedly, or heuristically, or one or more of the operations may be executed in a different order or omitted, or one or more other operations may be added.

Figure 2:
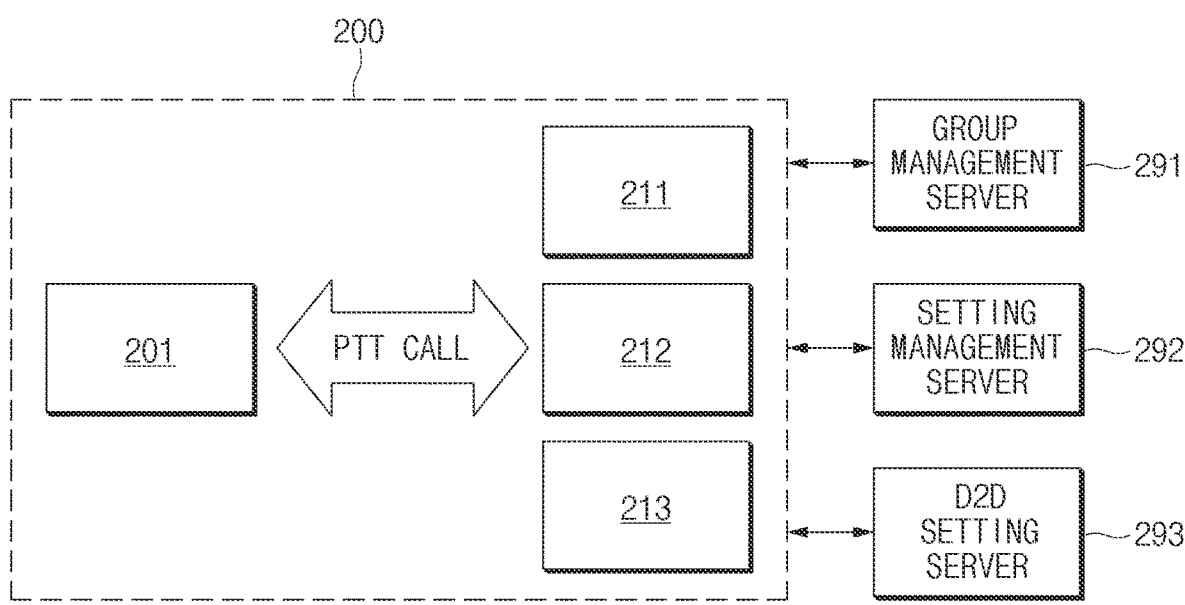
FIG. 2 illustrates a block diagram of a PTT service system according to an embodiment of the disclosure.

FIG. 2 illustrates a block diagram of a PTT service system according to an embodiment of the disclosure.

Hereinafter, PTT may be referred to as a term including MCPTT. In an embodiment, a PTT group call may be referred to as an MCPTT group call. The PTT group call may be referred to as a group call session in which a plurality of electronic devices (e.g., user devices) participate. The PTT session may be referred to as the PTT group call.

Referring to FIG. 2, a PTT session 200 may include a plurality of electronic devices 201, 211, 212, and 213. Each of the plurality of electronic devices 201, 211, 212, and 213 may have a configuration similar to that of the electronic device 101 of FIG. 1. The number of the plurality of electronic devices (i.e. participants) 201, 211, 212, and 213 of the PTT session 200 is an example and embodiments of the disclosure is not limited thereto. The electronic device 201, a first external electronic device 211, a second external electronic device 212, and a third external electronic device 213 of the PTT session 200 may support the PTT session 200 in an off-network.

According to an embodiment, the PTT session 200 may constitute one PTT service system together with a group management server 291, a setting management server 292, and a D2D setting server 293. Unlike the example of FIG. 2, the PTT service system may not include the group management server 291, the setting management server 292, and the D2D setting server 293. The electronic devices 201, 211, 212, and 213 of the PTT session 200 may obtain at least some of various pieces of information to be described later from a memory (e.g., the memory 130 of FIG. 1).

According to another embodiment, the plurality of electronic devices 201, 211, 212, and 213 receive setting information for off-network PTT communication from the group management server 291 and/or the setting management server 292. The setting information for off-network PTT communication may include at least some of group setting information and information needed to connect device to device (D2D) communication using a predetermined frequency without separate control of the mobile communication infrastructure to an off-network group call.

According to yet another embodiment, the group setting information may include group management information, user profile information, and/or service control information. The group management information may include a group identifier (ID) indicating each unique group, group members included in each group and priorities of the floor between the members, multicast addresses, and/or IDs used in D2D communication. The ID used in D2D communication may be referred to as a group ID (ProSe Layer-2 Group ID) on the proximity services (ProSe) layer. In an embodiment, the user profile information may include an MCPTT ID assigned to each of the electronic devices 201, 211, 212, and 213 and/or list information about groups for which an MCPTT service is allowed in an off-network. The MCPTT ID may correspond to user information about the corresponding electronic device. The service control information may include time limit information related to a request for the call and the floor in consideration of an MCPTT distributed control environment of the off-network. In addition, the plurality of electronic devices 201, 211, 212, and 213 may receive setting information such as frequency information and geographic information that may be used for D2D communication and/or permission information from the D2D setting server 293.

In an embodiment, the PTT session 200 may be a PTT session by a group for which the MCPTT service in the off-network is allowed. Each of the plurality of electronic devices 201, 211, 212, and 213 in the PTT session 200 may have a unique ProSe Layer-2 group ID. Each of the plurality of electronic devices 201, 211, 212, and 213 may have a unique MCPTT ID. The plurality of electronic devices 201, 211, 212, and 213 may be referred to as a group call participant.

In an embodiment, the plurality of electronic devices 201, 211, 212, and 213 may perform the PTT group call in the off-network by using a ProSe Layer-2 group ID and a multicast address to transmit and receive a floor control message and/or a media packet. (e.g., real time transport protocol (RTP) media packets). The plurality of electronic devices 201, 211, 212, and 213 may be configured to multicast data to other electronic devices in the PTT session 200.

In another embodiment, the electronic device having the floor may not exist in the PTT session 200. The electronic device desiring to have the floor may transmit a floor request message. For example, the electronic device 201 may transmit (e.g., multicast) a floor request message based on a floor request of the user (e.g., a user input for a PTT button). The electronic device 201 may start a timer (e.g., T201 timer) when transmitting the floor request message. If a response to the floor request message is not received, the electronic device 201 may increase a counter (e.g., C201) by one when the timer expires. If the value of the counter does not reach a specified value, the electronic device 201 may transmit the floor request message again and start the timer. If the value of the counter reaches the specified value during repetition of the operations (e.g., when the T201 timer expires a specified number of times), the electronic device 201 may transmit a message indicating (or informing of) obtaining of the floor (e.g., a floor taken message). The electronic device 201 may obtain the floor, and the electronic device 201 may transition to a state of having the floor (e.g., 'O:has permission' state).

In yet another embodiment, if the electronic device 201 has the floor, the electronic device 201 may operate as a floor arbitrator of the PTT session 200. If the electronic device 201 receives the message requesting the floor (e.g., floor request message) from another electronic device while the electronic device 201 is speaking (e.g., transmitting the RTP media packet), the electronic device 201 may store information about the electronic device requesting the floor in a floor request queue. The request queue may be included in, for example, a memory (e.g., the memory 630 of FIG. 6) of the electronic device 201. If the media transmission of the electronic device 201 is ended (e.g., if the PTT button is released), the electronic device 201 may determine another electronic device to transfer the floor based on information stored in the floor request queue. The electronic device 201 may transfer the floor to the other electronic device that has been determined by transmitting a floor granted message including information about the other electronic device. The electronic device 201 may transmit a message related to floor control based on an RTP control protocol (RTCP).

According to an embodiment, the electronic device 201 may transfer the floor to the first external electronic device 211. To transfer the floor, the electronic device 201 may transmit a floor granted message including information about the first external electronic device 211. According to another embodiment, the second external electronic device 212 and the third external electronic device 213 may recognize that the floor has been transferred to the first external electronic device 211 by receiving the floor granted message. For example, if the floor granted message is received, the second external electronic device 212 may compare information included in the message with information about a source (e.g., information about the electronic device 201) stored in its own memory (e.g., the memory 130 of FIG. 1), and may update the information about the source with the information included in the message (e.g., information about the first external electronic device 211) if the information about the source is different from the information included in the message. After transfer of the floor, the second external electronic device 212 and the third external electronic device 213 may ignore media packets (e.g., RTP media packets) received from other electronic devices except for the first external electronic device 211 currently having the floor.

As described above with reference to FIG. 2, in the PTT session 200, one electronic device operates as a floor arbitrator, and thus, it is possible to prevent a plurality of floors from occurring in the session. However, as will be described later with reference to FIG. 3, FIG. 4, and FIG. 5, a plurality of electronic devices having the floor in one session may exist.

Figure 3:
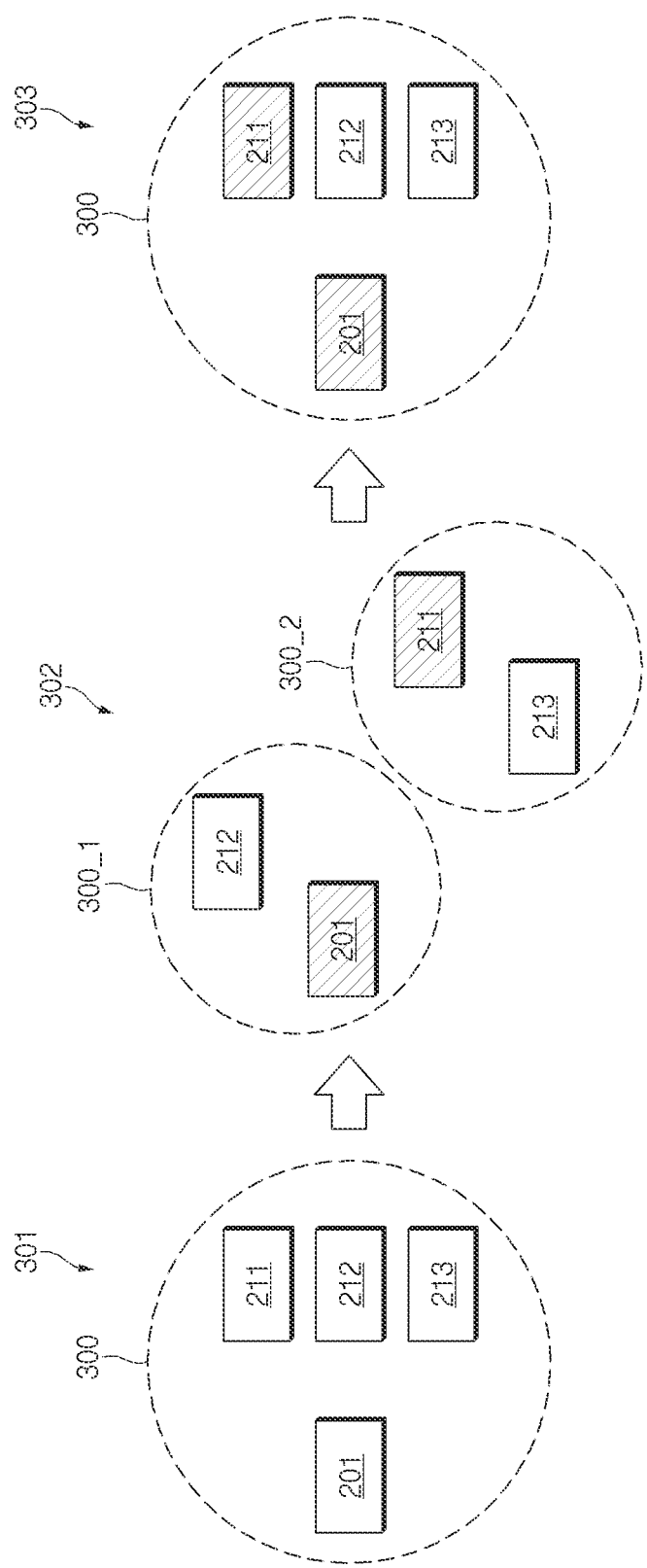
FIG. 3 illustrates an example of a situation in which a plurality of floors occurs according to an embodiment of the disclosure.

FIG. 3 illustrates an example of a situation in which a plurality of floors occurs according to an embodiment of the disclosure.

Figure 4:
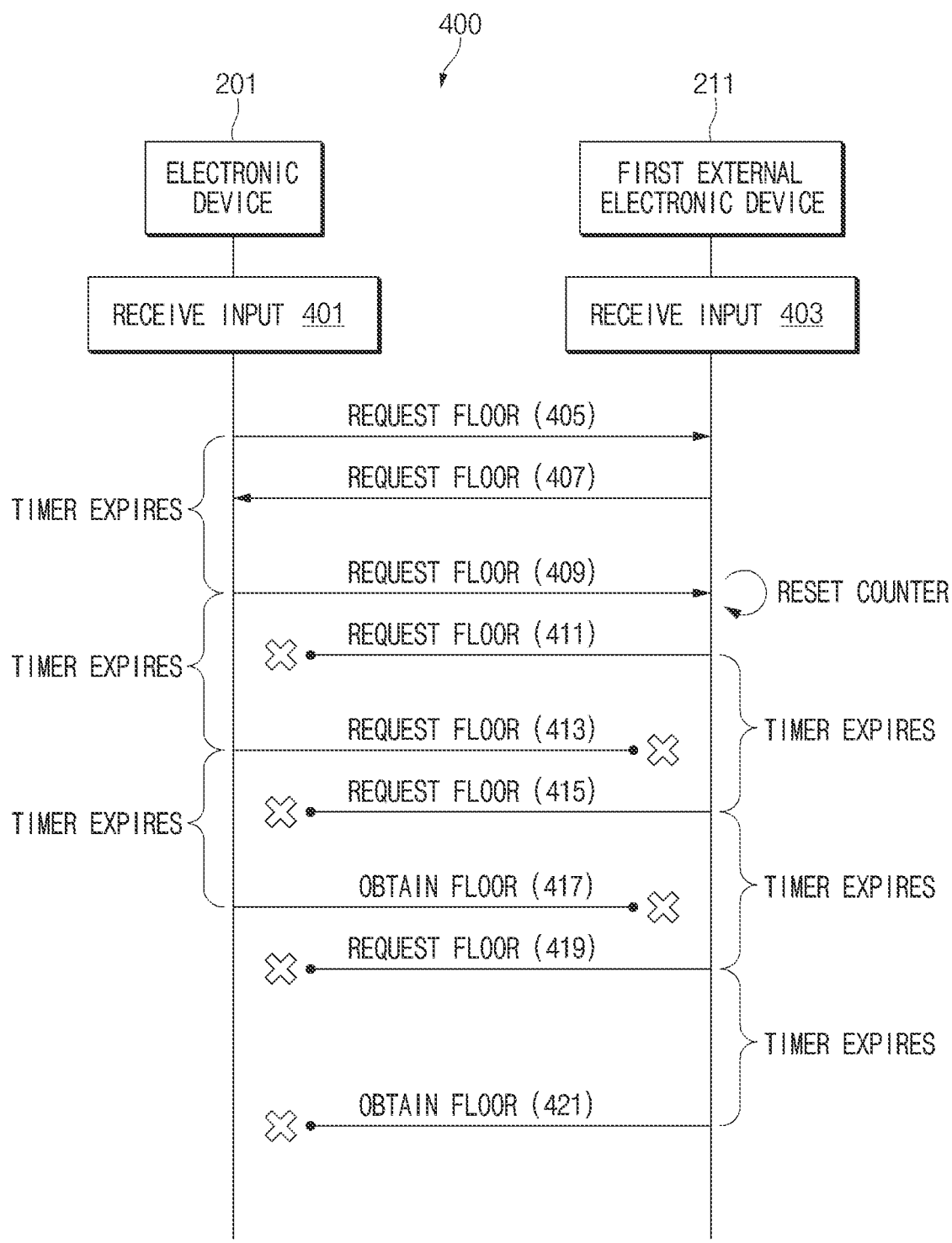
FIG. 4 illustrates a signal flow diagram in a situation in which a plurality of floors occurs according to an embodiment of the disclosure.

FIG. 4 illustrates a signal flow diagram 400 in a situation in which a plurality of floors occurs according to an embodiment of the disclosure.

Hereinafter, with reference to FIG. 3 and FIG. 4 together, a situation in which a plurality of floors may occur will be described.

Referring to reference numeral 301 of FIG. 3, a PTT session 300 may be constituted by an electronic device 201, a first external electronic device 211, a second external electronic device 212, and a third external electronic device 213. In an initial state, it may be assumed that all electronic devices of the PTT session 300 do not have a floor.

Referring to FIG. 4, in operation 401, an electronic device 201 may receive an input for a floor request (e.g., input for a PTT button). The electronic device 201 may transition from an 'O:silence' state to an 'O:pending request' state based on the input reception. Here, 'O' may indicate a state that the electronic device 201 has in the off-network. In operation 403, a first external electronic device 211 may receive an input for a floor request (e.g., input for the PTT button). The first external electronic device 211 may transition from the O:silence state to the O:pending request state based on the input reception.

In operation 405, the electronic device 201 may transmit (e.g., multicast) a floor request message in response to receiving the input. In an embodiment, the floor request message may include information about the electronic device 201. Similarly, in operation 407, in response to receiving the input, the first external electronic device 211 may transmit a floor request message.

In operation 409, the electronic device 201 may transmit the floor request message again. For example, the electronic device 201 may start a timer when performing operation 405, and perform operation 409 when the timer expires. When performing operation 409, the electronic device 201 may increase the value of the counter by one. In an embodiment, the first external electronic device 211 may reset (e.g., initialize) the value of the counter when receiving the floor request message in operation 409. For example, if the priority of the received floor request message or the priority of the electronic device 201 is greater than or equal to the priority of the first external electronic device 211, the first external electronic device 211 may reset the value of the counter (e.g., initialize to 1).

In reference numeral 302 of FIG. 3, the PTT session 300 may be divided into two groups. The PTT session 300 may be divided into a first group 300_1 including the electronic device 201 and the second external electronic device 212, and a second group 300_2 including the first external electronic device 211 and the third external electronic device 213. For example, the PTT session 300 may be divided into groups with movement of electronic devices in the PTT session 300. It may be assumed that the data transmission of the electronic device in the group is received only by the other electronic device in the same group and not by the electronic device in the other group, but the example is not limited thereto. Even if the electronic device 201, the first external electronic device 211, the second external electronic device 212, and the third external electronic device 213 all constitute one PTT session 300, a signal transmitted by another electronic device may not be received if a large amount of data (e.g., floor control message, RTP media packet) is generated and the congestion becomes higher or if the communication state deteriorates.

Referring to FIG. 4, in operation 411, the first external electronic device 211 may transmit the floor request message. As described above, the message of the first external electronic device 211 may not be received by the electronic device 201.

In operation 413, the electronic device 201 may transmit the floor request message again. In an embodiment, the floor request message may not be received by the first external electronic device 211. In another embodiment, the electronic device 201 may increase the value of the counter by one before transmitting the floor request message, and may transmit the floor request message and start the timer in operation 413 if the value of the counter is not equal to a specified value.

In operation 415, the first external electronic device 211 may transmit the floor request message. For example, the first external electronic device 211 may increase the value of the counter by one before transmitting the floor request message, and may transmit the floor request message and start the timer in operation 415 if the value of the counter is not equal to a specified value. The floor request message may not be transmitted by the electronic device 201.

In operation 417, the electronic device 201 may transmit a floor taken message. For example, after operation 413, the electronic device 201 may increase the value of the counter by one when the timer expires. With the increase in the value of the counter, the value of the counter may be changed to a value equal to the specified value (e.g., four). According to a name of the specified value for the value of the counter, the electronic device 201 may obtain the floor and transition to the state of having the floor (e.g., O:has permission state). In an embodiment, the electronic device 201 may transmit a message indicating obtaining of the floor. The floor taken message may also not be received by the first external electronic device 211.

In operation 419, the first external electronic device 211 may transmit the floor request message. For example, the first external electronic device 211 may increase the value of the counter by one when the timer expires after operation 415, and may transmit the floor request message and start the timer in operation 419 if the value of the counter is not equal to a specified value. The floor request message may not be transmitted by the electronic device 201.

In operation 421, the first external electronic device 211 may transmit the floor taken message. After operation 421, the first external electronic device 211 may increase the value of the counter by one when the timer expires. According to the name of the specified value for the value of the counter, the first external electronic device 211 may transmit a message indicating obtaining of the floor. The floor taken message may also not be received by the electronic device 201.

In reference numeral 303 of FIG. 3, two groups may constitute one PTT session 300 again. Alternatively, the communication state within the same group may be recovered. For example, congestion may be reduced. Each of the electronic device 201 and the first external electronic device 211 is in the state of having the floor (e.g., O:has permission state), and thus, each of the electronic device 201 and the first external electronic device 211 may transmit a media packet (e.g., RTP media packet). Accordingly, a situation may occur in which a plurality of electronic devices have the floor in one PTT session 300. Since the second external electronic device 212 of the first group 300_1 has received the floor taken message of the electronic device 201 (e.g., operation 417), the second external electronic device 212 may determine that the electronic device 201 is the source. Accordingly, the second external electronic device 212 may ignore the message from the first external electronic device 211. Similarly, the third external electronic device 213 may ignore the message from the electronic device 201.

Figure 5:
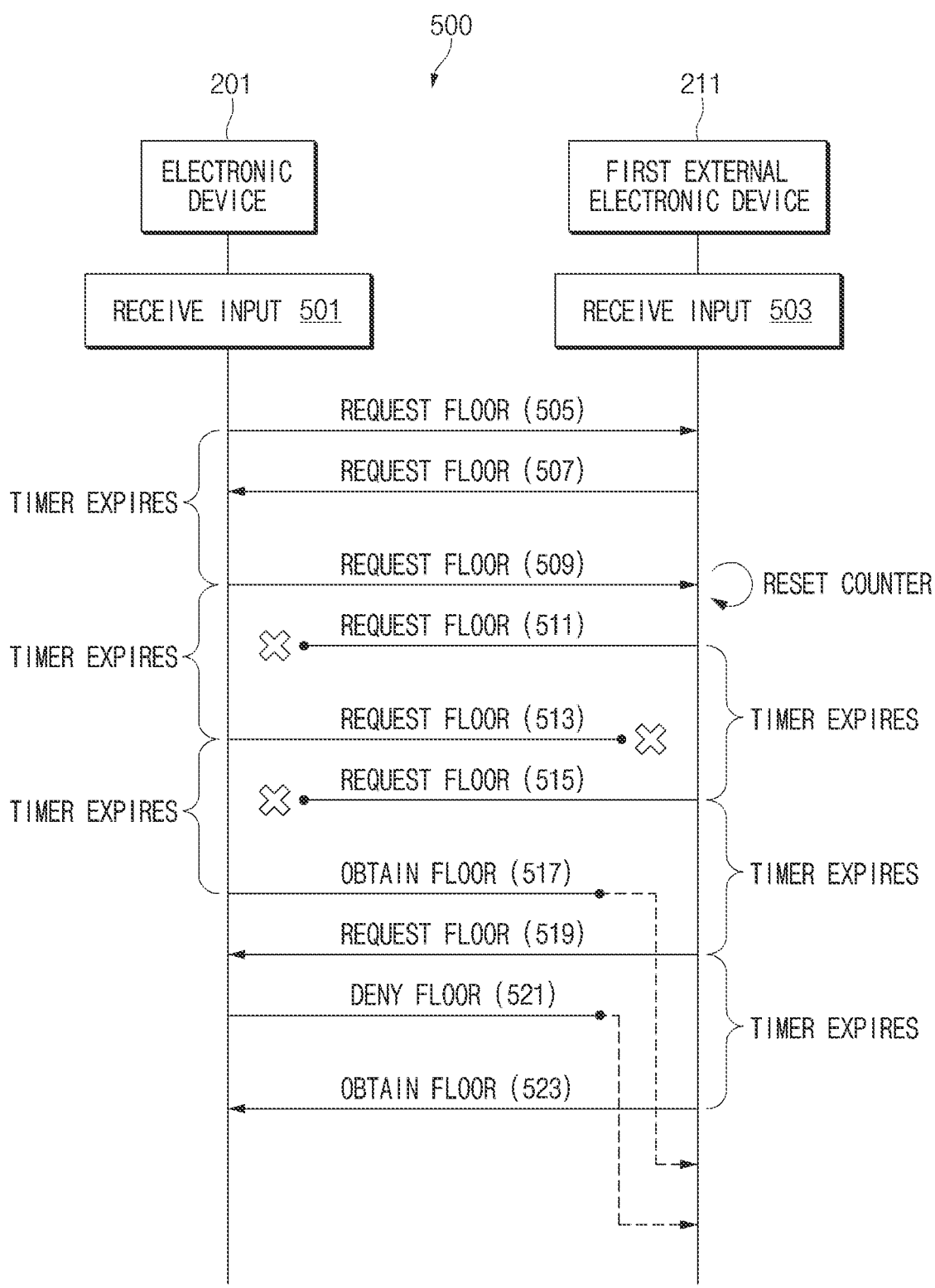
FIG. 5 illustrates a signal flow diagram in a situation in which a plurality of floors occurs according to an embodiment of the disclosure.

FIG. 5 illustrates a signal flow diagram 500 in a situation in which a plurality of floors occurs according to an embodiment of the disclosure.

For convenience of description, the description of the same operation as in FIG. 4 may be omitted. For example, operations 501, 503, 505, 507, and 509 of FIG. 5 may be referred to by operations 401, 403, 405, 407, and 409 of FIG. 4.

Referring to FIG. 5, in operation 511, a first external electronic device 211 may transmit a floor request message. FIG. 5 illustrates that the floor request message of the first external electronic device 211 is not received by an electronic device 201, but the example is not limited thereto. For example, a case is illustrated where the floor priority of the electronic device 201 is higher than that of the first external electronic device 211, and accordingly, a counter reset may not be performed even if the electronic device 201 receives the floor request message from the first external electronic device 211.

In operation 513, the electronic device 201 may transmit the floor request message again. The floor request message may not be received by the first external electronic device 211. The first external electronic device 211 may not receive the floor request message from the electronic device 201 depending on the communication state (e.g., congestion) of the PTT session (e.g., the PTT session 300 of FIG. 3). Accordingly, the first external electronic device 211 may not reset the counter.

In operation 515, the first external electronic device 211 may transmit the floor request message. For example, the first external electronic device 211 may increase the value of the counter by one before transmitting the floor request message, and may transmit the floor request message and start the timer in operation 515 if the value of the counter is not equal to a specified value. The floor request message may not be received by the electronic device 201, but as described above, examples of the disclosure are not limited thereto.

In operation 517, the electronic device 201 may transmit the floor taken message. For example, the electronic device 201 may increase the value of the counter by one when the timer expires. With the increase in the value of the counter, the value of the counter may be changed to a value equal to the specified value (e.g., four). According to the name of the specified value for the value of the counter, the floor taken message may be transmitted. The electronic device 201 may obtain the floor, and may transition to the state of having the floor (e.g., O:has permission state). In an example, transmission of the floor taken message by the electronic device 201 may be delayed. Message transmission may be delayed or lost depending on the communication state (e.g., increased congestion) of the PTT session 300. Accordingly, the floor taken message of the electronic device 201 may not be received by the first external electronic device 211.

In operation 519, the first external electronic device 211 may retransmit the floor request message. For example, the first external electronic device 211 may retransmit the floor request message as the first external electronic device 211 does not receive the floor taken message from the electronic device 201. The first external electronic device 211 may increase the value of the counter by one when the timer expires after operation 515, and may transmit the floor request message and start the timer in operation 519 if the value of the counter is not equal to a specified value. The floor request message may be received by the electronic device 201. However, since the electronic device 201 is already in the state of having the floor (e.g., O:has permission state), the electronic device 201 may deny the floor request from the first external electronic device 211. For example, the electronic device 201 may not perform floor control based on a request queue or deny the floor request when the request queue is already full.

In operation 521, the electronic device 201 may transmit a floor deny message. In an example, the floor deny message transmitted by the electronic device 201 may be delayed or lost depending on the communication state. The first external electronic device 211 may not stop the timer since the first external electronic device 211 does not receive the floor deny message. Although not shown, the floor request message transmitted by the first external electronic device 211 in operation 519 may not be received by the electronic device 201. For example, a message may be lost depending on the communication state. Operation 521 may be omitted. In operation 523, the first external electronic device 211 may transmit the floor taken message. After operation 519, the first external electronic device 211 may increase the value of the counter by one when the timer expires. According to a name of the specified value for the value of the counter, the first external electronic device 211 may transmit a message indicating obtaining of the floor, and may transition to the O:has permission state, which is the state of having the floor.

Then, even if the floor taken message transmitted in operation 517 and/or the floor deny message transmitted in operation 521, by the electronic device 201, is received with delay by the first external electronic device 211, the first external electronic device 211 may ignore the floor taken message and/or the floor delay message since the first external electronic device 211 is already in the state of having the floor. In this case, both the electronic device 201 and the first external electronic device 211 may be in the state of having the floor.

Hereinafter, with reference to FIG. 6, FIG. 7, FIG. 8, and FIG. 9, methods for floor control according to various examples of the disclosure may be described.

Figure 6:
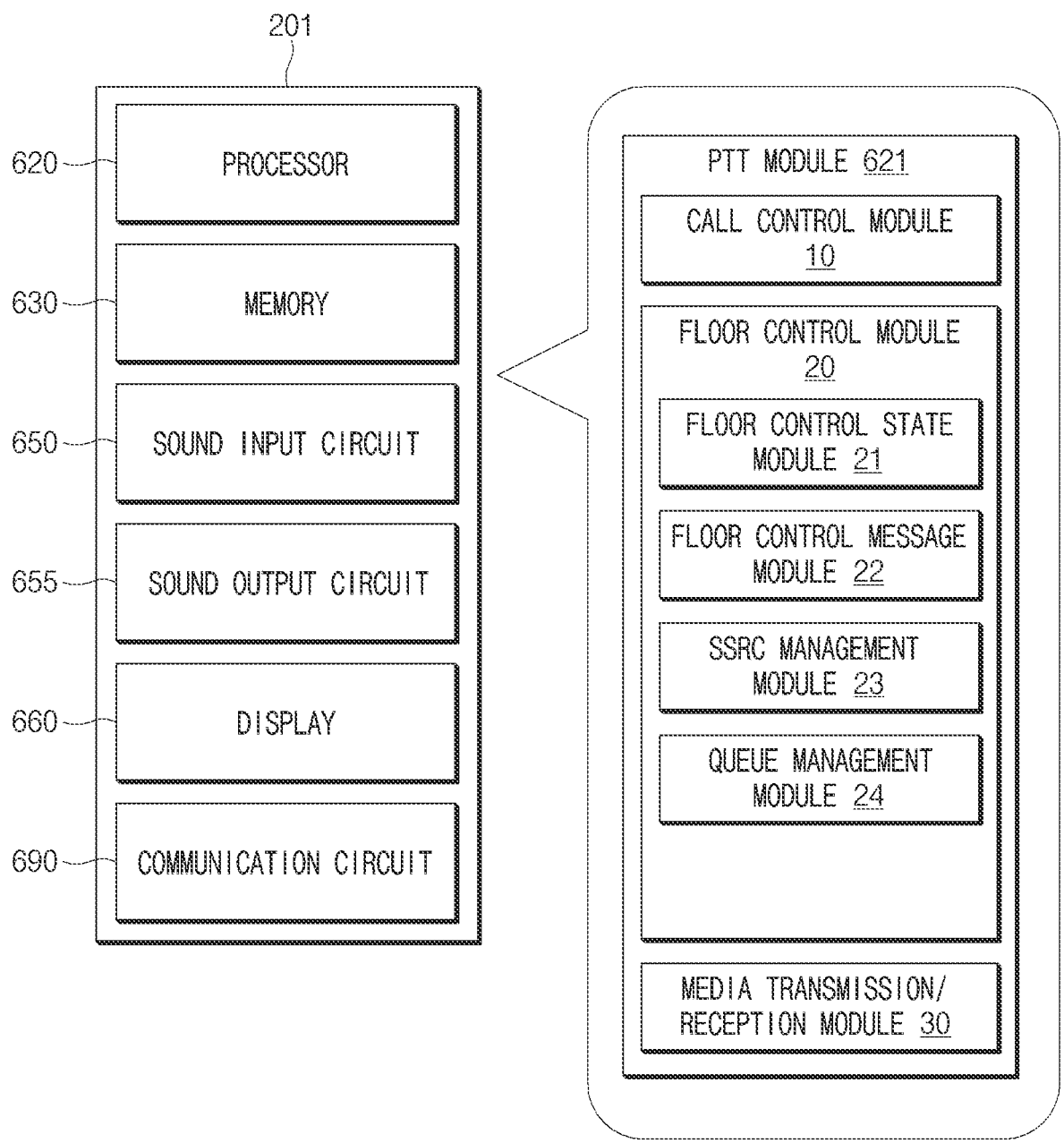
FIG. 6 illustrates a block diagram of the electronic device according to an embodiment of the disclosure.

FIG. 6 illustrates a block diagram 600 of the electronic device according to an embodiment of the disclosure.

Referring to FIG. 6, according to an embodiment, an electronic device 201 (e.g., an electronic device 101 of FIG. 1) may include a processor 620 (e.g., a processor 120 of FIG. 1 (e.g., an application processor and/or a communication processor)), a memory 630 (e.g., a memory 130 of FIG. 1), a sound input circuit 650 (e.g., a input module 150 of FIG. 1), a sound output circuit 655 (e.g., a sound output module 155 of FIG. 1), a display 660 e.g., a display module 160 of FIG. 1), and/or a communication circuit 690 (e.g., a communication module 190 of FIG. 1). The configurations of the electronic device 201 illustrated in FIG. 6 are examples, and embodiments of the disclosure are not limited thereto. For example, the electronic device 201 may not include at least one of the components illustrated in FIG. 6. For another example, the electronic device 201 may further include a component not illustrated in FIG. 6.

According to an embodiment, the processor 620 may be operatively connected to the memory 630, the sound input circuit 650, the sound output circuit 655, the display 660, and/or the communication circuit 690. The processor 620 may control components of the electronic device 201. For example, the processor 620 may control the components of the electronic device 201 according to one or more instructions stored in the memory 630. The processor 620 may include an application processor and/or a communication processor. The processor 620 may be built as one chip or a plurality of chips.

According to another embodiment, the sound input circuit 650 may include at least one microphone, and the sound output circuit 655 may include at least one speaker. The processor 620 may receive a media packet from an external electronic device by using the communication circuit 690 and output data of the media packet by using the sound output circuit 655. The processor 620 may obtain sound data by using the sound receiving circuit 650, convert the obtained sound data into a media packet, and transmit the obtained sound data to an external electronic device.

According to yet another embodiment, the display 660 may display an image and receive a touch input. For example, the display 660 may include a plurality of pixels that emit light. The processor 620 may display an image by using at least some pixels of the a plurality of pixels of the display 660. The display 660 may include a touch sensing layer for sensing a touch input. The display 660 may transfer information on the obtained touch input to the processor 620.

In an embodiment, if a media packet (e.g., RTP media packet) is received from an external electronic device, the processor 620 may determine whether its own device (e.g., the electronic device 201) has the floor. If the state of the electronic device 201 is a state of having the floor (e.g., O:has permission), the processor 620 may determine that the own device has the floor. For example, if the processor 620 determines that the own device has the floor, the processor 620 may determine whether to maintain the floor. As another example, if the determination is made that the own device does not have the floor, the processor 620 may receive and decode a media packet from an external electronic device having the floor, and output the received media packet through the sound output circuit 655. Alternatively, the processor 620 may ignore a media packet from an external electronic device that does not have the floor. For example, the processor 620 may parse only a header of the media packet received from the external electronic device that does not have the floor and may not decode payload data.

In another embodiment, the processor 620 may determine whether to maintain the floor. The processor 620 may determine whether to maintain the floor by using information in the header of the received media packet. If the value of a header field parameter of the media packet is greater than its value, the processor 620 may give up the floor. For example, the processor 620 may determine whether to maintain the floor using a sequence number and/or a synchronization source ID (SSRC ID). The sequence number is a value (e.g., a value of 16 bits) for loss detection and reconstruction of an RTP packet, and may increase by one for every packet. The SSRC ID is an identifier having a length of 12 bytes and may be set to an arbitrary value. Within one RTP session, SSRC IDs may be assigned to devices so as not to overlap each other. In an example, the processor 620 may determine whether to maintain the floor only if the own device has the floor.

For example, if the sequence number of the received media packet is greater than its sequence number, the processor 620 may give up the floor. Alternatively, if the SSRC ID of the received media packet is greater than its SSRC ID, the processor 620 may give up the floor. For another example, if the sequence number of the received media packet is smaller than its sequence number, the processor 620 may give up the floor. Alternatively, if the SSRC ID of the received media packet is smaller than its SSRC ID, the processor 620 may give up the floor. If the determination is made to give up the floor, the processor 620 may transmit a floor release message indicating (or informing of) release of the floor. The electronic device 201 may transition from the floor possession state (e.g., O:has permission) to the silence state (e.g., O:silence).

In still another embodiment, if the sequence number of the received media packet is less than or equal to its sequence number, the processor 620 may maintain the floor. Alternatively, if the SSRC ID of the received media packet is less than or equal to its SSRC ID, the processor 620 may maintain the floor. If the floor is maintained, the processor 620 may ignore (e.g., discard) the media packet received from the external electronic device.

According to an embodiment, the electronic device 201 may include a PTT module 621. The PTT module 621 may be a software module based on execution of instructions stored in the memory 630 by the processor 620 of the electronic device 201. For example, the above-described operations of the processor 620 may be referred to as operations of the PTT module 621. Operations of the PTT module 621 to be described later may also be referred to as operations of the processor 620. Each 'module' of the PTT module 621 may be referred to as 'means'.

For example, the PTT module 621 may include a call control module 10, a floor control module 20, and a media transmission/reception module 30.

According to another embodiment, the call control module 10 may perform a PTT group call connection and manage calls as a whole. The call control module 10 may set up a group call or manage the electronic device 201 to join an already set up group call. For example, the call control module 10 may transmit a PTT group call announcement for requesting group call start to the same PTT group members in the vicinity. In addition, the call control module 10 may check a group call announcement received from the surroundings, and extract call-related information from a PTT group call announcement if the group call announcement is for a group call in which participation is permitted.

According to still another embodiment, the floor control module 20 may control the floor to perform a PTT group call in an off-network. For example, the method for floor control method by the processor 620 described above may be performed by the floor control module 20. The floor control module 20 may include a floor control state module 21, a floor control message module 22, an SSRC management module 23, and a queue management module 24.

According to yet another embodiment, the floor control state module 21 may manage the floor state of the electronic device 201. The floor control state module 21 may manage and store a state corresponding to the electronic device 201 among a plurality of states defined in relation to the floor of the PTT group call in the off-network. The plurality of states may include a start-stop state ('start-stop'), a silent state ('O:silence'), a state of not having the floor ('O:has no permission'), a state of having the floor ('O:has permission'), a request pending state ('O:pending request'), a floor grant state ('O:pending granted'), and/or a waiting state ('O:queued'). The floor control state module 21 may determine the next state of the electronic device 201 based on at least some of a transmitted or received floor control message or media, or an elapsed time of the current state, based on the current state of the electronic device 201.

In an embodiment, the floor control state module 21 may determine whether to maintain the floor. The floor control state module 21 may obtain a header parameter of the media packet by using the media transmission/reception module 30, and determine whether to maintain the floor by using the header parameter. The floor control state module 21 may transmit a floor release message by using the floor control message module 22 when the determination is made to give up the floor, and may cause the state of the electronic device 201 to transition to the silent state (e.g., O:silence).

In another embodiment, the floor control message module 22 may decode the received floor control message and encode the transmitted floor control message.

In yet another embodiment, the SSRC management module 23 may store and manage the SSRC (or SSRC ID) of a current floor arbitrator having the current floor and the SSRC of a next floor arbitrator. The next floor arbitrator may mean a participant with the earliest order among at least one floor request participant stored in the request queue (e.g., the memory 630) of the electronic device 201, if the electronic device 201 operates as the current floor arbitrator. The SSRC management module 23 may store or update the SSRC of the participant stored in the earliest order in the queue as the SSRC of the next floor arbitrator. The SSRC management module 23 may store or update the SSRC of the electronic device recognized by the electronic device 201 as the floor arbitrator as the SSRC of the current floor arbitrator. For example, if the electronic device 201 operates as the current floor arbitrator, its SSRC may be stored or updated as the SSRC of the current floor arbitrator. For another example, if another electronic device operates as a current floor arbitrator, the electronic device 201 may store or update the SSRC of the current floor arbitrator based on a floor control message (e.g., a floor taken message) including an SSRC of the current floor arbitrator. Furthermore, if the SSRC of the current floor arbitrator is updated based on the SSRC of the next floor arbitrator, the SSRC management module 23 may discard the SSRC of the next floor arbitrator. For example, if the floor release message is received, the SSRC management module 23 may discard the SSRC of the corresponding message from the SSRC of the current floor arbitrator.

In still another embodiment, the queue management module 24 may manage the floor request received while the electronic device 201 serves as the floor arbitrator. For example, if the electronic device 201 receives the floor request message, the queue management module 24 may store, in the request queue, at least a portion of information on external electronic devices included in the floor request message. Information on external electronic devices that have requested the floor may include, for example, at least some of IDs, SSRCs, and priorities of the electronic devices. The information on external electronic devices stored in the request queue may be transmitted while being included in a floor granted message.

According to an embodiment, the media transmission/reception module 30 may receive a media packet from the outside. Alternatively, the media transmission/reception module 30 may convert media such as voice of the user and sound into a packet form, and transmit the converted media packet. The media packet may include a real time transport protocol (RTP) media packet.

According to another embodiment, if the media packet is received, the PTT module 621 may use the floor control state module 21 to identify whether the floor is present. If the floor is present, the PTT module 621 may determine whether to maintain the floor by using the floor control state module 21. The floor control state module 21 may obtain a header parameter of the media packet by using the media transmission/reception module 30, and determine whether to maintain the floor by using the header parameter. For example, the floor control state module 21 may determine whether to maintain the floor by comparing SSRCs by using the SSRC management module 23. The floor control state module 21 may use the floor control message module 22 based on whether to maintain the floor. For example, the floor control state module 21 may transmit a floor release message by using the floor control message module 22 if the determination is made to give up the floor. The floor control state module 21 may update state information about the electronic device 201 if the determination is made to give up the floor. For example, the floor control state module 21 may cause the state to transition to the silent state (e.g., O:silence).

Hereinafter, embodiments for controlling the floor of the electronic device 201 of FIG. 2 may be described with reference to FIG. 7 and FIG. 8. In examples of FIG. 7 and FIG. 8, reference numeral 303 of FIG. 3 may be referred to. For example, it is assumed that, referring to reference numeral 303 of FIG. 3, the electronic device 201 and the first external electronic device 211 have the floor. Furthermore, the second external electronic device 212 may recognize that the electronic device 201 has the floor, but the third external electronic device 213 may recognize that the first external electronic device 211 has the floor.

Figure 7:
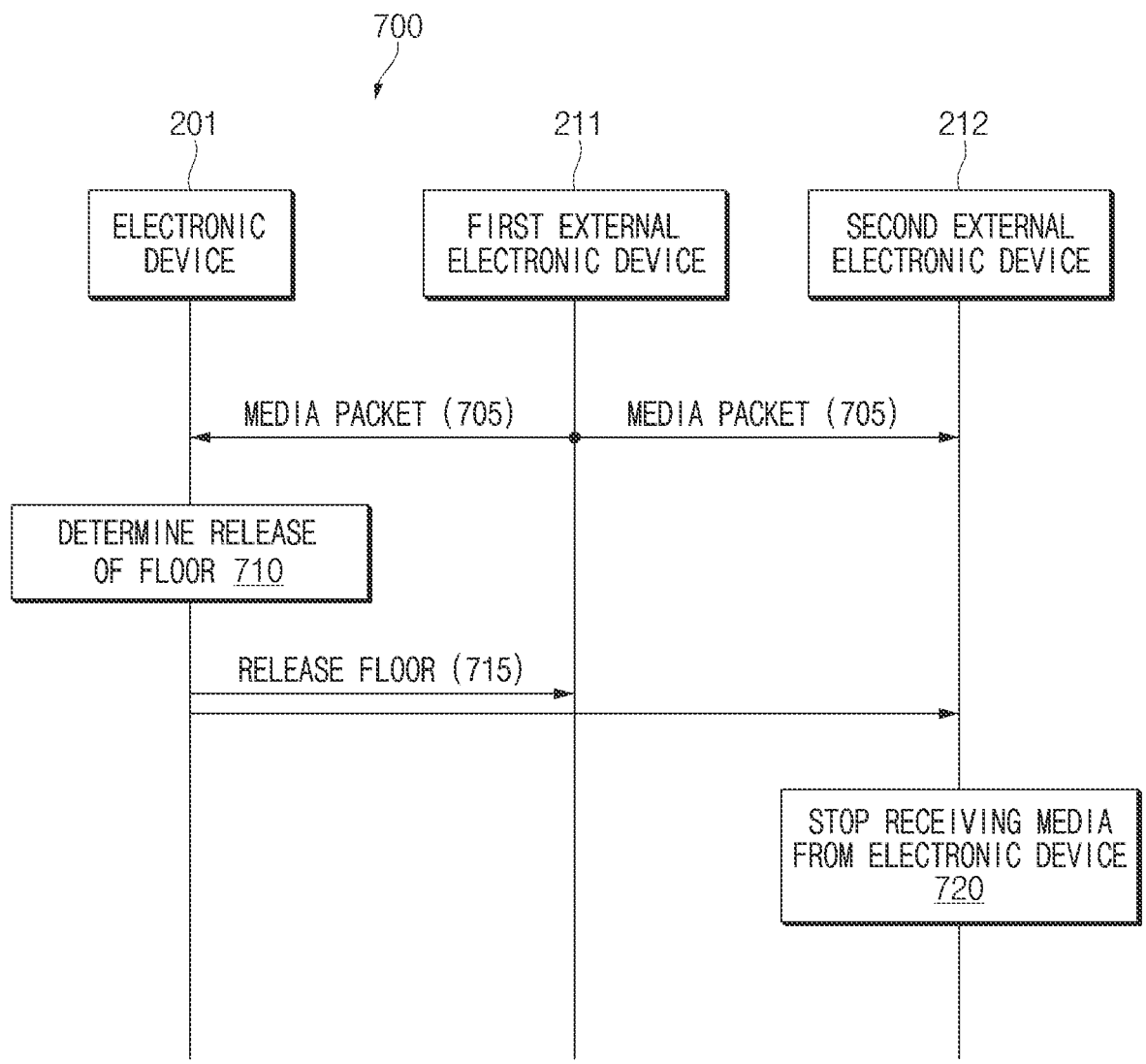
FIG. 7 illustrates a signal flow diagram at the time of making a determination to release the floor of an electronic device according to an embodiment of the disclosure.

FIG. 7 illustrates a signal flow diagram 700 at the time of making a determination to release the floor of an electronic device according to an embodiment of the disclosure.

Referring to FIG. 7, according to an embodiment, in operation 705, a first external electronic device 211 may transmit a media packet. Since a second external electronic device 212 recognizes that an electronic device 201 has a floor, the second external electronic device 212 may ignore the media packet of the first external electronic device 211. Since the electronic device 201 is in the floor possession state, the electronic device 201 may determine whether to maintain the floor of the electronic device 201.

According to an embodiment, in operation 710, the electronic device 201 may determine to release the floor. For example, the electronic device 201 may determine the release of the floor based on the SSRC ID and/or the sequence number.

According to another embodiment, in operation 715, the electronic device 201 may transmit a floor release message. Since the first external electronic device 211 is in the floor possession state, the first external electronic device 211 may ignore the floor release message and maintain the floor possession state (e.g., has permission). The second external electronic device 212 may compare the SSRC ID included in the received floor release message with the SSRC ID of the floor arbitrator stored in the second external electronic device 212. Since the two SSRC IDs are the same, the second external electronic device 212 may discard the stored SSRC ID. The electronic device 201 may transition to the silence state (e.g., silence) after transmitting the floor release message.

According to still another embodiment, in operation 720, the second external electronic device 212 may stop receiving media from the electronic device 201. The second external electronic device 212 may transition from a floor non-possession state (e.g., has no permission) to the silence state (e.g., silence). After stopping receiving media from the electronic device 201, the second external electronic device 212 transitions to a floor non-possession state (e.g., has no permission) if a media packet is received from the first external electronic device 211, and may receive media from the first external electronic device 211. If the media packet is received from the first external electronic device 211, the electronic device 201 in the silence state may transition to the floor non-possession state (e.g., has no permission), and may receive media from the first external electronic device 211.

Although not shown in FIG. 7, a third external electronic device (e.g., the third external electronic device 213 of FIG. 2) may also receive the floor release message. Since the SSRC ID of the floor arbitrator stored in the third external electronic device 213 is different from the SSRC ID of the received floor release message, the third external electronic device 213 may ignore the floor release message. The third external electronic device 213 may maintain the floor non-possession state (e.g., has no permission).

Figure 8:
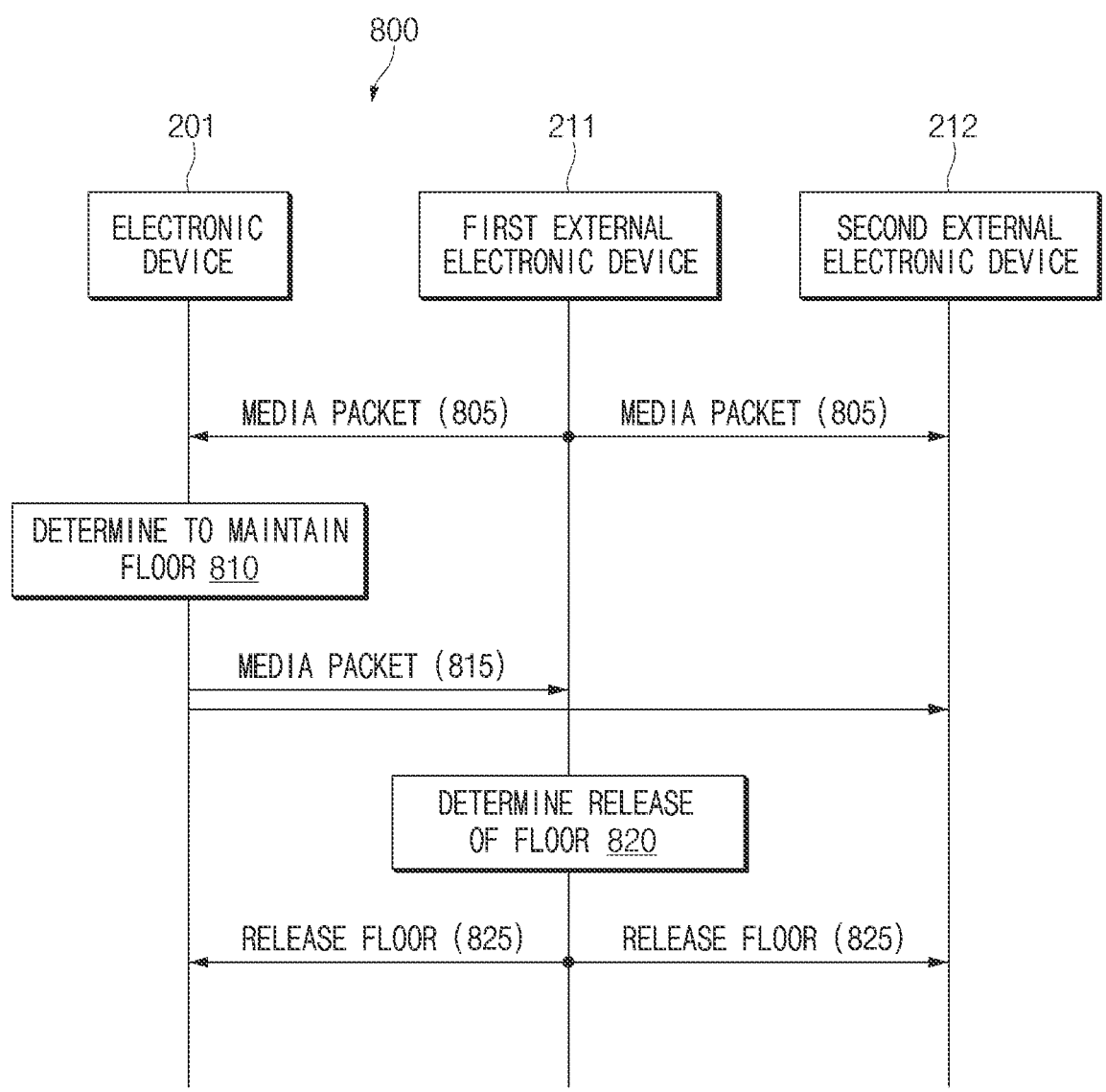
FIG. 8 illustrates a signal flow diagram at the time of making a determination to maintain the floor of an electronic device according to an embodiment of the disclosure.

FIG. 8 illustrates a signal flow diagram 800 at the time of making a determination to maintain the floor of an electronic device according to an embodiment of the disclosure.

Referring to FIG. 8, according to an embodiment, in operation 805, a first external electronic device 211 may transmit a media packet. Since a second external electronic device 212 recognizes that an electronic device 201 has a floor, the second external electronic device 212 may ignore the media packet of the first external electronic device 211. Since the electronic device 201 is in the floor possession state, the electronic device 201 may determine whether to maintain the floor of the electronic device 201.

In an embodiment, in operation 810, the electronic device 201 may determine to maintain the floor. For example, the electronic device 201 may determine to maintain the floor based on the SSRC ID and/or the sequence number. The electronic device 201 may maintain a floor possession state (e.g., has permission).

In another embodiment, in operation 815, the electronic device 201 may transmit a media packet. Since the first external electronic device 211 is in the floor possession state, the first external electronic device 211 may determine whether to maintain the floor of the first external electronic device 211. The second external electronic device 212 may output the media packet received from the electronic device 201.

In still another embodiment, in operation 820, the first external electronic device 211 may determine release of the floor. For example, the first external electronic device 211 may determine the release of the floor based on the SSRC ID and/or the sequence number.

In yet another embodiment, in operation 825, the first external electronic device 211 may transmit a floor release message. Since the electronic device 201 is in the floor possession state, the first external electronic device 211 may ignore the floor release message and maintain the floor possession state (e.g., has permission). The second external electronic device 212 may compare the SSRC ID of the received floor release message with the SSRC ID of the floor arbitrator stored in the second external electronic device 212. Since the two SSRC IDs are different from each other, the second external electronic device 212 may ignore the floor release message. In this case, the second external electronic device 212 may maintain the floor non-possession state (e.g., has no permission).

Although not shown in FIG. 8, a third external electronic device (e.g., the third external electronic device 213 of FIG. 2) may also receive the floor release message. Since the SSRC ID of the floor arbitrator stored in the third external electronic device 213 and the SSRC ID of the received floor release message are the same, the third external electronic device 213 may discard the stored SSRC ID of the floor arbitrator, and may stop receiving media from the first external electronic device 211. In this case, the third external electronic device 213 may transition from the floor non-possession state (e.g., has no permission) to the silence state (e.g., silence). After stopping receiving media from the first external electronic device 211, the third external electronic device 213 may transition to the floor non-possession state (e.g., has no permission) if a media packet is received from the electronic device 201, and may receive media from the electronic device 201.

Figure 9:
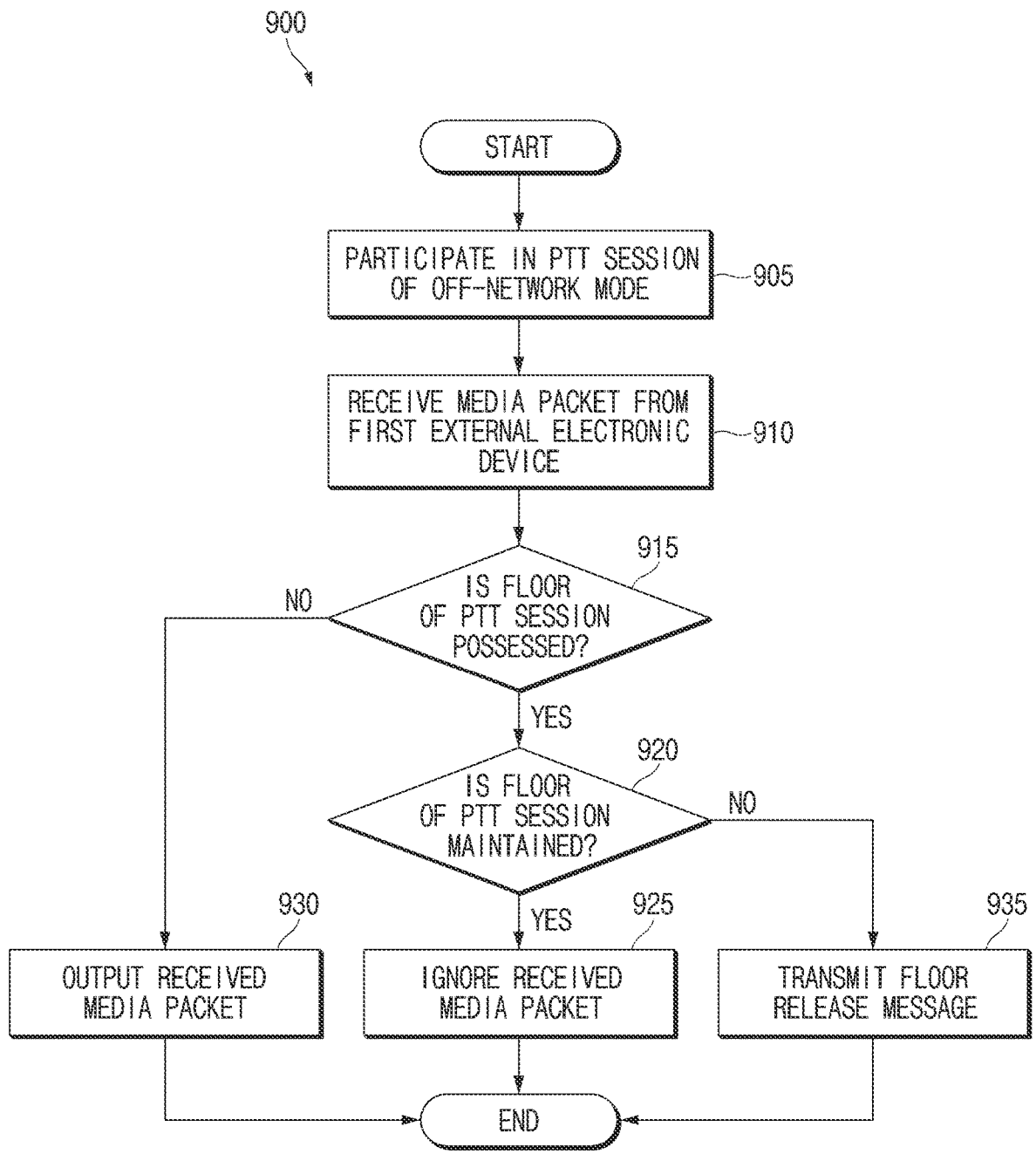
FIG. 9 is a flowchart of a method for floor control by an electronic device according to an embodiment of the disclosure.

FIG. 9 is a flowchart 900 of a method for floor control by the electronic device 201 according to an embodiment of the disclosure.

Referring to FIG. 9, according to an embodiment, in operation 905, an electronic device (e.g., an electronic device 201 of FIG. 2) may participate in a PTT session of an off-network mode. The electronic device 201 may participate in (e.g., generate) a PTT session (e.g., a PTT group call) by performing a call setup procedure with other electronic devices. The electronic device 201 may share multimedia parameters (e.g., audio/video codec information, a multimedia port, and/or an encoding key) with other electronic devices. If the notification message is received, the electronic device 201 may participate in the PTT session by setting its multimedia parameters according to information in the received notification message. For another example, the electronic device 201 may participate in a previously generated PTT session by accepting an invitation from another electronic device of the previously generated PTT session. After participating in the PTT session, the electronic device 201 may be in a state in which the floor in the corresponding PTT session is obtained or in a state in which the floor is not obtained. Operations of the electronic device 201 described below are not limited depending on whether or not the electronic device 201 obtains the floor.

According to an embodiment, in operation 910, the electronic device 201 may receive a media packet from the first external electronic device 211 of the PTT session. The media packet may be an RTP media packet. The RTP media packet may include an RTP header. The RTP header may include a sequence number and an SSRC ID.

According to another embodiment, in operation 915, the electronic device 201 may determine whether the electronic device 201 possesses the floor of the PTT session. For example, the electronic device 201 may determine whether the electronic device 201 possesses the floor of the PTT session by using information about the state related to the floor stored in the memory. For example, if the state of the electronic device 201 is the floor possession state (e.g., O:has permission), the electronic device 201 may determine that the electronic device 201 possesses the floor. For another example, if the state of the electronic device 201 is the silence state (e.g., silence) or the floor non-possession state (e.g., has no permission), the electronic device 201 determines that the electronic device 201 does not possess the floor.

According to yet another embodiment, if the electronic device 201 does not possess the floor (e.g., NO in operation 915), in operation 930, the electronic device 201 may output the received media packet. For example, the electronic device 201 may decode the received media packet and output data for the decoded media packet. The electronic device 201 may output video data and/or audio data for the received media packet. If the electronic device 201 is in the silence state, the electronic device 201 may transition from the silence state to the floor non-possession state in response to the reception of the media packet.

Although not shown in FIG. 9, according to an embodiment, the electronic device 201 may determine whether to output data for the media packet based on information about the received media packet. For example, if the electronic device 201 receives the media packet in the floor non-possession state, the electronic device 201 may determine whether to output data for the media packet. The electronic device 201 may compare information about a synchronization source stored in the memory of the electronic device 201 with the SSRC ID of the received media packet so as to check whether the two are the same. If the information about the synchronization source and the received SSRC ID are the same, the electronic device 201 may output the received media packet in operation 930. If the information about the synchronization source and the received SSRC ID are different, the electronic device 201 may ignore (e.g., discard) the media packet.

According to still another embodiment, if the electronic device 201 possesses the floor (e.g., YES in operation 915), in operation 920, the electronic device 201 may determine whether to maintain the floor of the PTT session. The electronic device 201 may determine whether to maintain the floor of the PTT session by using information included in a header of the received media packet. For example, the electronic device 201 may obtain information included in the header of the media packet by parsing only the portion of the header of the media packet.

In an embodiment, the electronic device 201 may determine to maintain the floor by using the SSRC ID included in the header of the media packet. The electronic device 201 may determine whether to maintain the floor by comparing the SSRC ID (hereinafter, the received SSRC ID) included in the header of the received media packet with the SSRC ID (hereinafter, the stored SSRC ID) stored in the memory of the electronic device 201. For example, if the received SSRC ID is greater than the stored SSRC ID, the electronic device 201 may determine to give up the floor. For another example, if the received SSRC ID is smaller than the stored SSRC ID, the electronic device 201 may determine to maintain the floor.

In another embodiment, the electronic device 201 may determine to maintain the floor by using the sequence number included in the header of the media packet. The electronic device 201 may determine whether to maintain the floor by comparing the sequence number (hereinafter, received sequence number) included in the header of the received media packet with the sequence number (hereinafter, stored sequence) of the packet that has been lately transmitted or a packet to be transmitted, by the electronic device 201. For example, if the received sequence number is greater than the stored sequence number, the electronic device 201 may determine to give up the floor. For another example, if the received sequence number is less than or equal to the stored sequence number, the electronic device 201 may determine to maintain the floor. For yet another example, if the received sequence number is smaller than the stored sequence number, the electronic device 201 may determine to give up the floor.

In yet another embodiment, the electronic device 201 may determine to maintain the floor by using the SSRC ID and the sequence number included in the header of the media packet. The electronic device 201 may determine whether to maintain the floor by comparing the sequence number (hereinafter, received sequence number) included in the header of the received media packet with the sequence number (hereinafter, stored sequence) of the packet that has been lately transmitted or a packet to be transmitted, by the electronic device 201. For example, if the received sequence number is greater than the stored sequence number, the electronic device 201 may determine to give up the floor. For another example, if the received sequence number is smaller than the stored sequence number, the electronic device 201 may determine to maintain the floor. For yet another example, if the received sequence number and the stored sequence number are the same, the electronic device 201 may determine to maintain the floor based on the SSRC IDs. The electronic device 201 may determine whether to maintain the floor by comparing the SSRC ID (hereinafter, the received SSRC ID) included in the header of the received media packet with the SSRC ID (hereinafter, the stored SSRC ID) stored in the memory of the electronic device 201. For example, if the received SSRC ID is greater than the stored SSRC ID, the electronic device 201 may determine to give up the floor. For another example, if the received SSRC ID is smaller than the stored SSRC ID, the electronic device 201 may determine to maintain the floor.

According to an embodiment, if the electronic device 201 gives up the floor of the PTT session (e.g., NO in operation 920), in operation 935, the electronic device 201 may transmit a floor release message. For example, the electronic device 201 may multicast the floor release message to other electronic devices in the session. The electronic device 201 may transition from the floor possession state to the floor non-possession state (has no permission) or the silence state.

According to another embodiment, if the floor of the PTT session is maintained (e.g., YES in operation 920), in operation 925, the electronic device 201 may ignore the received media packet. The electronic device 201 may discard the received media packet without outputting it. The electronic device 201 may parse only the header of the media packet without decoding a payload of the media packet. If the electronic device 201 maintains the floor of the PTT session, the electronic device 201 may transmit a media packet including the media obtained by the electronic device 201 to other electronic devices of the PTT session.

The operations of the electronic device 201 described above with reference to FIG. 9 are examples, and at least some of the operations may be omitted. For example, the method for floor control of FIG. 9 may be performed only if the electronic device 201 possesses the floor of the PTT session. In this case, operations 915 and 930 may be omitted. In addition, in response to the reception of the media packet (e.g., operation 910), the determination (e.g., operation 920) of whether to maintain the floor of the PTT session may be made.

According to yet another embodiment, an electronic device (e.g., the electronic device 201) may include a communication circuit (e.g., the communication circuit 690 of FIG. 6), a processor (e.g., the processor 620 of FIG. 6) operatively connected to the communication circuit, and a memory (the memory 630 of FIG. 6) operatively connected to the processor. The memory may store instructions that, when executed, cause the processor to participate in a push-to-talk (PTT) session of an off-network mode, receive a media packet including media data from an external electronic device of the PTT session while the floor of the PTT session is possessed, determine whether to maintain the floor of the PTT session based on at least one parameter included in a header of the media packet, and transmit a message indicating release of the floor of the PTT session in a case of not maintaining the floor of the PTT session. For example, the at least one parameter may include at least one of a synchronization source identifier (SSRC ID) or a sequence number. For example, the media packet may include a real time transport protocol (RTP) media packet.

The instructions, when executed, may cause the processor to make a determination not to maintain the floor of the PTT session if the SSRC ID included in the media packet is greater than the SSRC ID allocated to the electronic device.

The instructions, when executed, may cause the processor to make a determination not to maintain the floor of the PTT session if the sequence number included in the media packet is greater than a sequence number of a media packet lastly transmitted by the electronic device.

The instructions, when executed, may cause the processor to obtain the at least one parameter from the media packet by parsing only the header of the media packet.

The instructions, when executed, may cause the processor to change a state of the electronic device to a state corresponding to non-possession of the floor, in the case of not maintaining the floor of the PTT session.

The instructions, when executed, may cause the processor to discard the media packet in a case of maintaining the floor of the PTT session.

According to an embodiment, a method for floor control of an electronic device may include making a push-to-talk (PTT) group call of an off-network mode, receiving a media packet from an external electronic device involved in the group call, identifying whether the electronic device has the floor of the group call, in response to receiving the media packet, determining whether to maintain the floor based on at least one parameter included in a header of the media packet if the electronic device has the floor of the group call, and transmitting a message indicating release of the floor when the determination is made not to maintain the floor. The at least one parameter may include at least one of a synchronization source identifier (SSRC ID) or a sequence number. For example, the media packet may include a real time transport protocol (RTP) media packet. For example, the PTT group call may include a mission critical PTT (MCPTT) group call. The method for floor control of the electronic device may further include obtaining the at least one parameter from the media packet by parsing only the header of the media packet. The method for floor control of the electronic device may further include changing state information about the electronic device to a state corresponding to non-possession of the floor, when the determination is made not to maintain the floor of the PTT session. The method for floor control of the electronic device may further include discarding the media packet when the determination is made to maintain the floor. The method for floor control of the electronic device may further include determining whether to output media data included in the media packet based on the SSRC ID included in the media packet if the electronic device does not have the floor of the group call.

According to another embodiment, the determining of whether to maintain the floor may include making a determination not to maintain the floor of the PTT session if the SSRC ID included in the media packet is greater than the SSRC ID allocated to the electronic device, and making a determination to maintain the floor of the PTT session if the SSRC ID included in the media packet is smaller than the SSRC ID allocated to the electronic device.

The determining of whether to maintain the floor may include making a determination not to maintain the floor of the PTT session if the sequence number included in the media packet is greater than a sequence number of a media packet lastly transmitted by the electronic device, and making a determination to maintain the floor of the PTT session if the sequence number included in the media packet is smaller than or equal to a sequence number of a media packet lastly transmitted by the electronic device.

According to yet another embodiment, the determining of whether to output media data may include outputting the media data if the SSRC ID included in the media packet corresponds to information about a floor arbitrator stored in the electronic device, and ignoring the media packet if the SSRC ID included in the media packet is different from the information about the floor arbitrator stored in the electronic device.

The identifying of whether the electronic device has the floor of the group call may include obtaining state information about the electronic device from the memory of the electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit;
memory, comprising one or more storage media, storing instructions; and
one or more processors communicatively coupled to the communication circuit and the memory,
wherein the instructions, when executed by the one or more processors individually or collectively, cause the electronic device to:
participate in a push-to-talk (PTT) session of an off-network mode,
receive a media packet including media data from an external electronic device of the PTT session while a floor of the PTT session is possessed by the electronic device,
in response to receiving the media packet while the floor is possessed by the electronic device, determine whether to maintain the floor of the PTT session based on at least one parameter included in a header of the media packet, the at least one parameter including a sequence number corresponding to a value for loss detection and reconstruction of the media packet, and
transmit a message indicating release of the floor of the PTT session in a case of determining not to maintain the floor of the PTT session.

2. The electronic device of claim 1, wherein the at least one parameter further includes a synchronization source identifier (SSRC ID).

3. The electronic device of claim 2, wherein the instructions, when executed by the one or more processors individually or collectively, further cause the electronic device to;
determine not to maintain the floor of the PTT session if the SSRC ID included in the media packet is greater than the SSRC ID allocated to the electronic device.

4. The electronic device of claim 2, wherein the instructions, when executed by the one or more processors individually or collectively, further cause the electronic device to;
determine not to maintain the floor of the PTT session if the sequence number included in the media packet is greater than the sequence number of a media packet lastly transmitted by the electronic device.

5. The electronic device of claim 2, wherein the instructions, when executed by the one or more processors individually or collectively, further cause the electronic device to:
obtain the at least one parameter from the media packet by parsing only the header of the media packet.

6. The electronic device of claim 1, wherein the instructions, when executed by the one or more processors individually or collectively, further cause the electronic device to;
change a state of the electronic device to a state corresponding to non-possession of the floor, in the case of determining not to maintain the floor of the PTT session.

7. The electronic device of claim 1, wherein the media packet includes a real time transport protocol (RTP) media packet.

8. The electronic device of claim 1, wherein the instructions, when executed by the one or more processors individually or collectively, further cause the electronic device to:
discard the media packet in a case of determining to maintain the floor of the PTT session.

9. A method for floor control of an electronic device, the method comprising:
making a push-to-talk (PTT) group call and participating in a PTT session of an off-network mode;
receiving a media packet from an external electronic device involved in the group call;
identifying that the electronic device has a floor of the group call, in response to receiving the media packet;
in response to receiving the media packet and identifying that the electronic device has the floor of the group call, determining whether to maintain the floor based on at least one parameter included in a header of the media packet, the at least one parameter including a sequence number corresponding to a value for loss detection and reconstruction of the media packet; and transmitting a message indicating release of the floor based on determining not to maintain the floor.

10. The method of claim 9, wherein the at least one parameter further includes a synchronization source identifier (SSRC ID).

11. The method of claim 10, wherein the determining of whether to maintain the floor further includes:

determining not to maintain the floor of the PTT session based on the SSRC ID included in the media packet being greater than the SSRC ID allocated to the electronic device; and determining to maintain the floor of the PTT session if based on the SSRC ID included in the media packet being smaller than the SSRC ID allocated to the electronic device.

12. The method of claim 10, wherein the determining of whether to maintain the floor further includes:

determining not to maintain the floor of the PTT session based on the sequence number included in the media packet being greater than a sequence number of a media packet lastly transmitted by the electronic device; and determining to maintain the floor of the PTT session if based on the sequence number included in the media packet being smaller than or equal to a sequence number of a media packet lastly transmitted by the electronic device.

13. The method of claim 9, further comprising:

obtaining the at least one parameter from the media packet by parsing only the header of the media packet.

14. The method of claim 9, further comprising:

changing state information about the electronic device to a state corresponding to non-possession of the floor, based on determining not to maintain the floor.

15. The method of claim 9, further comprising:

discarding the media packet based on determining to maintain the floor.

* * * * *